March 3, 1942. C. E. SCATES 2,275,321
HYDRAULIC TRANSMISSION DEVICE
Filed Nov. 22, 1939 2 Sheets-Sheet 1
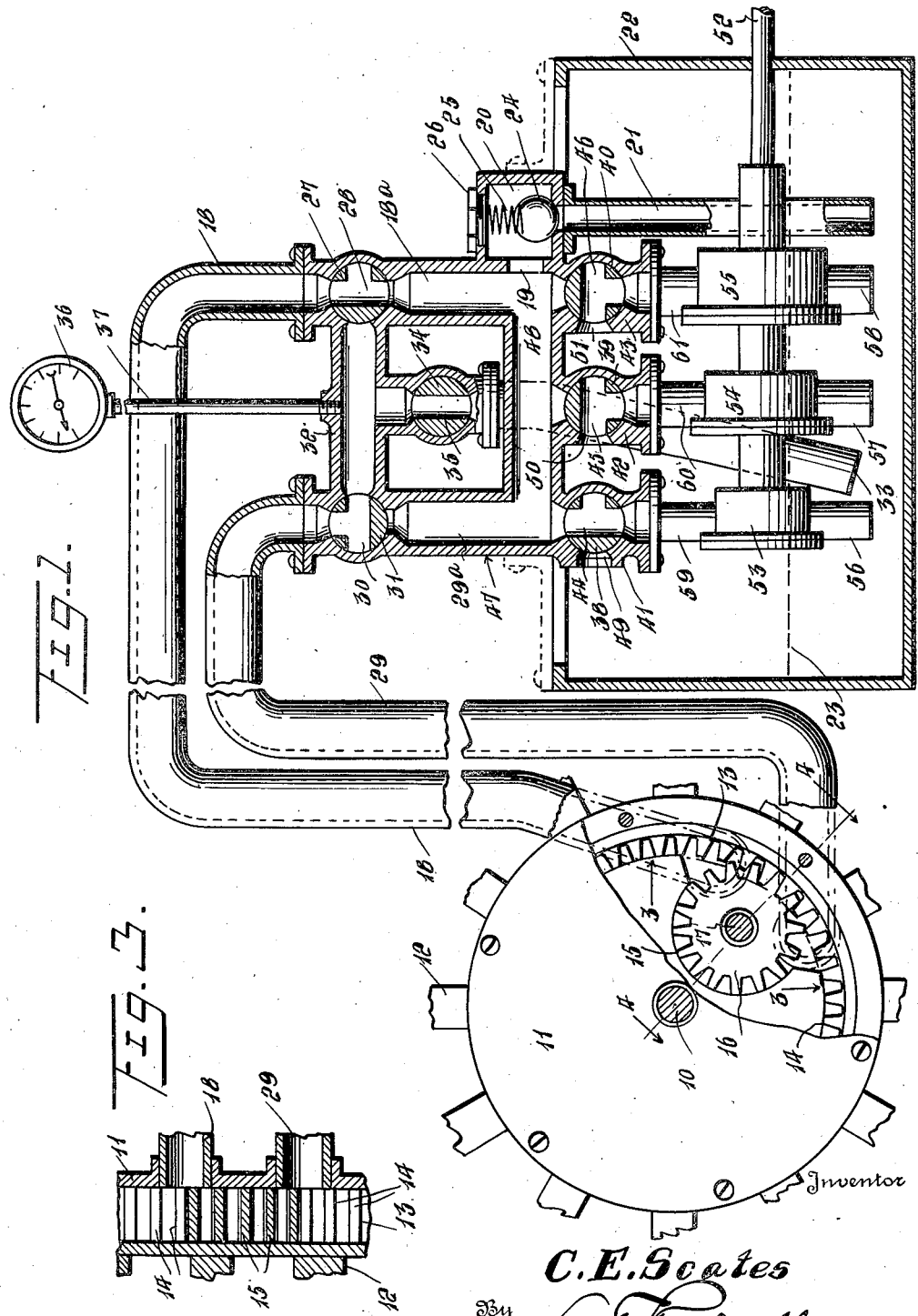

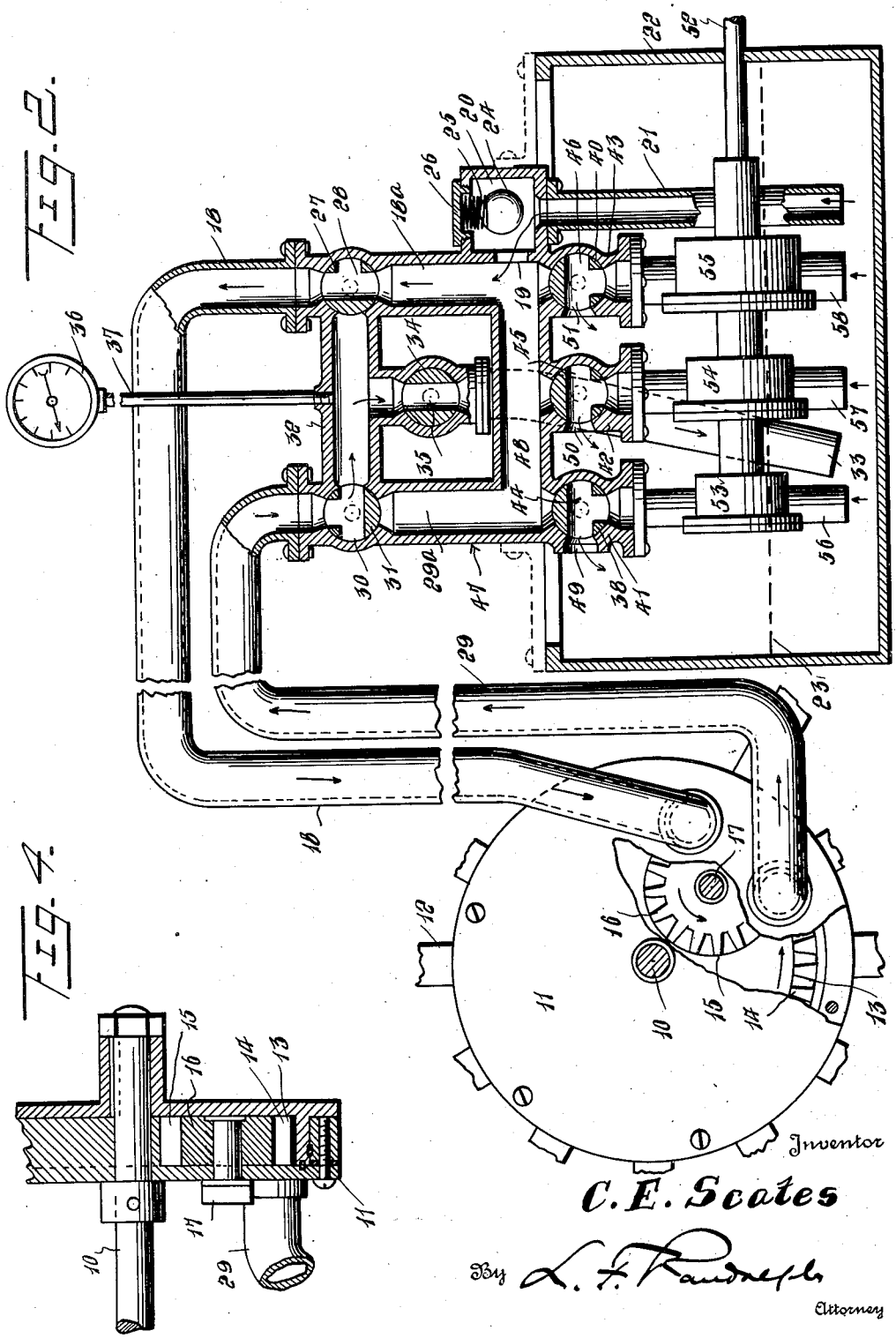

Patented Mar. 3, 1942

2,275,321

UNITED STATES PATENT OFFICE 2,275,321

HYDRAULIC TRANSMISSION DEVICE

Charles E. Scates, Hueneme, Calif.

Application November 22, 1939, Serial No. 305,738

2 Claims. (Cl. 60—53)

This invention relates to an hydraulic device having a multi-speed transmission in connection with a braking device.

It is aimed to provide a novel construction which will be reversible, rotary, in which many transmission speeds may be realized and which has a valve operable automatically when the parts normally constituting a motor, function as a pump.

The more specific objects and advantages will become apparent from a consideration of the description following taken in connection with accompanying drawings illustrating an operative embodiment.

In said drawings:

Fig. 1 is a view in elevation showing my improved mechanism, the view being partly broken away and in section to disclose details;

Figure 2 is a view similar to Figure 1 but showing the valves in a different position;

Figure 3 is a sectional view taken on the line 3—3 of Figure 1; and

Figure 4 is a sectional view taken on the line 4—4 of Figure 1.

Referring specifically to the drawings wherein like reference characters designate like or similar parts, 10 designates a rotatable shaft which may be the driven shaft for the wheels of a truck or other vehicle. Rotatable with the shaft 10 and in a stationary housing or casing 11, at the hub of one of such wheels which is designated 12, is an internal gear wheel 13 enmeshed at its teeth 14 with the teeth 15 of a gear 16 located within the housing 11 and journaled on a shaft 17 mounted by such housing. Said gears 13 and 16 in combination with the housing 11 constitute a motor.

Communicating with the housing 11 is a conduit 18 communicating with a continuation thereof at 18a which in turn is in communication through a port 19, valve chamber 20, and suction pipe or tube 21, with the interior of a tank or reservoir 22, adapted to contain the hydraulic fluid up to the level indicated at 23. When the hydraulic fluid is drawn into the motor, the suction unseats a valve 24 in the chamber 20 which is normally in closing relation to the upper end of the tube 21 through the expansion of a spring 25, positioned by means of a removable closure 26. A three way valve 27 is rotatably mounted in the conduit 18a, the same having the usual T-shaped port 28 therethrough.

The hydraulic fluid is adapted to pass through a conduit 29 and through the T-shaped port 30 of a rotatable valve 31, mounted in a continuation 29a of the pipe 29. However, the valve 31 is operable to direct such hydraulic fluid through a transverse conduit 32 having a tube 33 communicating with the tank 22 and containing a two way rotatable valve 34, used for braking purposes and whose port is designated 35. A pressure gauge 36 is arranged in communication with the interior of the conduit 32 through the medium of a tube 37.

The gears 13 and 16 may be operated in the direction opposite to that for which valve 27 is manually set simply by turning both valves 27 and 31, in Figure 1, 90° counterclockwise.

A transmission is built into the apparatus and in this connection three, three way valves 38, 39 and 40 are rotatably mounted in chambers 41, 42 and 43, such valves having the usual T-shaped ports therethrough at 44, 45 and 46, respectively. It is to be borne in mind that all of the valves 27, 31, 38, 39 and 40 are manually operable from the exterior of the structure and are all arranged within the driver's or operator's compartment on the vehicle, in which compartment the gauge 36 is also visible.

Said casings or chambers 41, 42 and 43 are part of an integral casting 47 which also includes the conduits 18a, 29a, 32, 33 and a cross conduit 48 which connects the conduits 18a and 29a. Said chambers 41, 42 and 43, have outlet ports therein as at 49, 50 and 51.

A rotatable shaft 52, is journaled in the wall of the tank 22 and drives pumps 53, 54 and 55 simultaneously, such shaft 52 being driven from any suitable engine or the like. The inlet pipes of said pumps at 56, 57 and 58, respectively, communicate with the hydraulic fluid in the tank 22 and the outlets of such pumps as at 59, 60 and 61, communicate with the interior of the casings 41, 42 and 43. Pump 53 is the smallest. Pump 54 is the next in size and has a capacity twice that of the pump 53 while pump 55 is the largest in size and has a capacity twice that of the pump 54.

With the valves set as in Figure 1, pump 53 delivers fluid through valve port 44 of valve 38 into conduits 48 and 18a, through port 28 and conduit 18 into the motor and then back through conduit 29, port 30, conduit 32, port 35 and tube 33 into tank 22. This places the vehicle in motion by reason of the fact that the fluid rotates the gear 13 which is keyed to the shaft 10. With the vehicle in motion, the operator upon turning valve 38 to the extent of ninety degrees clockwise, will cause the fluid to return back into the tank 22 since the gears 13 and 16 function under such conditions as a gear pump instead of a motor and draw fluid up through pipe 21 past ball valve 24, through port 19, into conduit 18a, port 20, conduit 18 into gears 13 and 16 and back through conduit 29, port 30, conduit 32, port 35 and tube 33 into tank 22. By manually closing valve 34, the vehicle is stopped. When the vehicle is coasting after the pumps have been cut-off as in Figure 2, and the road is a hill, the vehicle will come to a stop because no power is being applied, since ball valve 24 rests on its seat, refusing to let the fluid back, thereby locking or blocking the vehicle from rolling back down the hill.

It will be realized that the pumps 53, 54 and 55 in combination with their valves, provide not only for the low speed, for which the parts are arranged, as in Figure 1, but also for a multiplicity of speeds through the manual adjustment and variations in the positions of the valves 38, 39 and 40, for instance seven different speeds, with the arrangement shown.

It is apparent that valve 34 may be any quick acting valve, and also that conduits 18 and 29 may be connected to not only one wheel as shown but to a plurality of wheels.

Various changes may be resorted to provided they fall within the spirit and scope of the invention.

I claim as my invention:

1. Apparatus of the class described having a motor, a source of hydraulic fluid, conduit means for passage of the fluid from the source to the motor and from the latter to the source, said conduit means including a casting having parallel side conduit sections, a first transverse conduit section and a second transverse conduit section, said transverse conduit sections communicating at opposite ends with the side conduit sections, conduits leading from the side sections to the motor, a casing integral with the casting communicating with the side and second transverse conduit sections having a valve therein, means to pump fluid from the source into the second transverse conduit section under control of the valve, three way valves at the junction of the first transverse conduit section and side sections to connect one of the conduits leading to the motor to one of the side conduit sections while the other conduit leading to the motor is connected to the first transverse conduit section or to connect the other conduit leading to the motor to the other side conduit while connecting the first mentioned conduit leading to the motor to the first transverse conduit section, and a conduit means leading from the first transverse section to the source and including a valve operable for braking purposes.

2. Apparatus of the class described having a motor, a source of hydraulic fluid, conduit means for passage of the fluid from the source to the motor and from the latter to the source, said conduit means including a casting having parallel side conduit sections, a first transverse conduit section and a second transverse conduit section, said transverse conduit sections communicating at opposite ends with the side conduit sections, conduits leading from the side sections to the motor, a casing integral with the casting communicating with the side and second transverse conduit sections having a valve therein, means to pump fluid from the source into the second transverse conduit section under control of the valve, three way valves at the junction of the first transverse conduit section and side sections to connect one of the conduits leading to the motor to one of the side conduit sections while the other conduit leading to the motor is connected to the first transverse conduit section or to connect the other conduit leading to the motor to the other side conduit while connecting the first mentioned conduit leading to the motor to the first transverse conduit section, a conduit means leading from the first transverse section to the source and including a valve operable for braking purposes, an offset chamber integral with said casting, conduit means leading from the chamber communicating with the source, and a check valve closing the last mentioned conduit when the first mentioned valve is opened, the check valve being constructed and arranged to open through operation of the motor when the first mentioned valve is closed.

CHARLES E. SCATES.